United States Patent
Ehrmann et al.

(10) Patent No.: US 8,281,559 B2
(45) Date of Patent: Oct. 9, 2012

(54) PACKAGING MACHINE HAVING AN ULTRASONIC DEVICE

(75) Inventors: Elmar Ehrmann, Bad Groenenbach (DE); Tieme Jan Slomp, Bad Groenenbach (DE); Roland Sparakowski, Tannheim (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 512 days.

(21) Appl. No.: 12/533,594

(22) Filed: Jul. 31, 2009

(65) Prior Publication Data

US 2010/0024360 A1 Feb. 4, 2010

(30) Foreign Application Priority Data

Aug. 1, 2008 (DE) .................. 10 2008 035 994

(51) Int. Cl.
*B65B 31/00* (2006.01)
(52) U.S. Cl. ................. 53/510; 53/559; 53/511; 53/433
(58) Field of Classification Search .......... 53/510, 53/559, 511, 433, 453, 427; 156/73.3, 73.1, 156/251, 269
See application file for complete search history.

(56) References Cited

U.S. PATENT DOCUMENTS

| | | | |
|---|---|---|---|
| 3,481,100 A | 12/1969 | Bergstrom | |
| 3,651,615 A * | 3/1972 | Bohner et al. | 53/452 |
| 3,830,365 A * | 8/1974 | Krueger et al. | 206/471 |
| 3,955,740 A * | 5/1976 | Shoh | 228/1.1 |
| 3,972,155 A * | 8/1976 | Mahaffy et al. | 53/453 |
| 4,190,690 A * | 2/1980 | Rabeneck et al. | 428/35.5 |
| 4,517,790 A * | 5/1985 | Kreager | 53/552 |
| 4,529,473 A * | 7/1985 | Mims | 156/580.2 |
| 4,534,818 A * | 8/1985 | Kreager et al. | 156/466 |
| 4,618,516 A * | 10/1986 | Sager | 428/542.8 |
| 4,668,316 A * | 5/1987 | Sager | 156/73.1 |
| 5,096,052 A * | 3/1992 | Raque et al. | 198/867.12 |
| 5,345,747 A | 9/1994 | Raque et al. | |
| 6,824,632 B2 * | 11/2004 | Blanchard et al. | 156/73.3 |
| 8,091,322 B2 * | 1/2012 | Ehrmann et al. | 53/433 |
| 2006/0248860 A1 | 11/2006 | Liao | |

FOREIGN PATENT DOCUMENTS

| | | |
|---|---|---|
| DE | 1 296 357 B | 5/1969 |
| DE | 1 561 956 A1 | 5/1970 |
| DE | 10 2005 039 673 A1 | 11/2006 |

(Continued)

OTHER PUBLICATIONS

European Search Report Dated Oct. 20, 2009, Application No. 09009929.2-2308, Applicant MULTIVAC Sepp Haggenmuller GhmH and Co KG, 4 Pages.

(Continued)

*Primary Examiner* — Sameh H. Tawfik
(74) *Attorney, Agent, or Firm* — Brooks Kushman P.C.

(57) ABSTRACT

The present invention relates to a packaging machine having an ultrasonic device (1), the ultrasonic device (1) comprising: an ultrasonic generator (2) which generates electric vibrations; an ultrasonic converter (3) which converts the generated electric vibrations into mechanical vibrations of the same frequency; a transformation intermediate piece (4) which transfers the mechanical vibrations to a sonotrode (5); the sonotrode (5) comprising a sound-radiating end surface (6) at which it reflects the mechanical vibrations, so that a standing wave to be passed into a packaging foil (18, 19) is formed, and the sound-radiating end surface (6) being disposed in a vacuum and/or in a modified atmosphere.

17 Claims, 7 Drawing Sheets

FOREIGN PATENT DOCUMENTS

| | | |
|---|---|---|
| DE | 10 2005 039 690 A1 | 11/2006 |
| DE | 10 2007 021 967 A1 | 11/2008 |
| EP | 1 110 701 B1 | 10/2004 |
| EP | 1 516 816 A1 | 3/2005 |
| EP | 1 717 150 A1 | 11/2006 |
| EP | 1 932 763 A1 | 6/2008 |
| EP | 1 510 459 B1 | 9/2008 |
| FR | 2 826 336 A1 | 12/2002 |

OTHER PUBLICATIONS

German Office Action Dated Apr. 16, 2009 (3 Pages).

\* cited by examiner

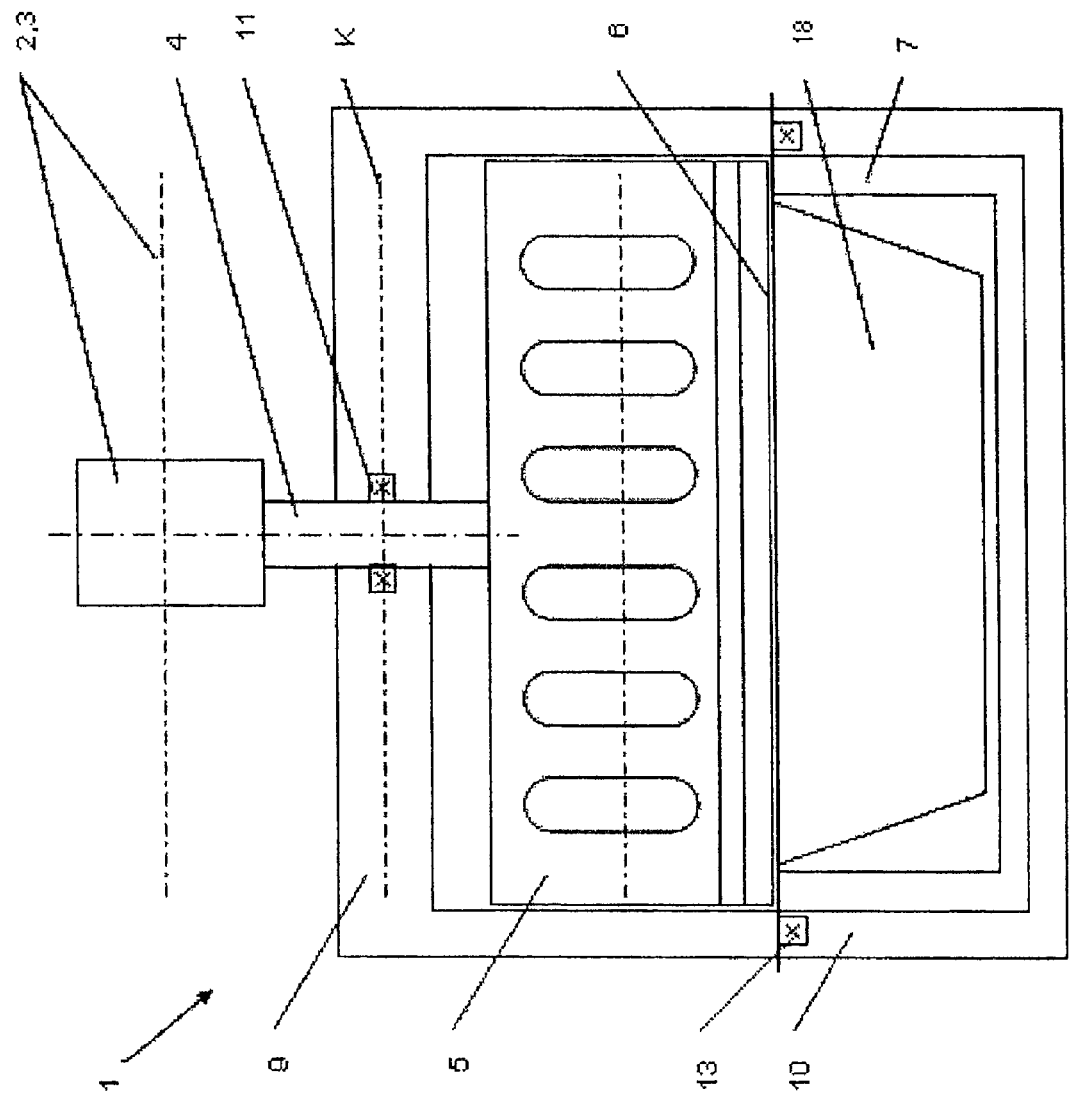

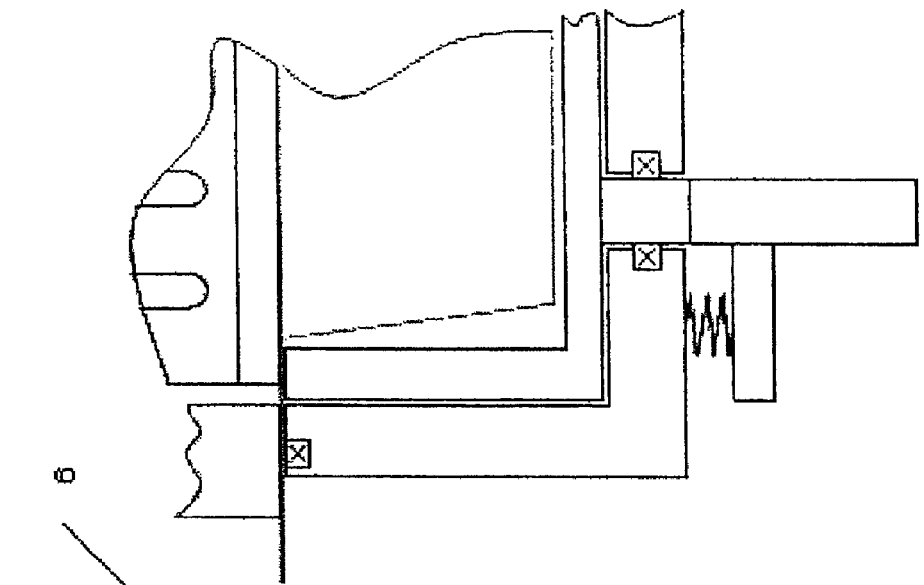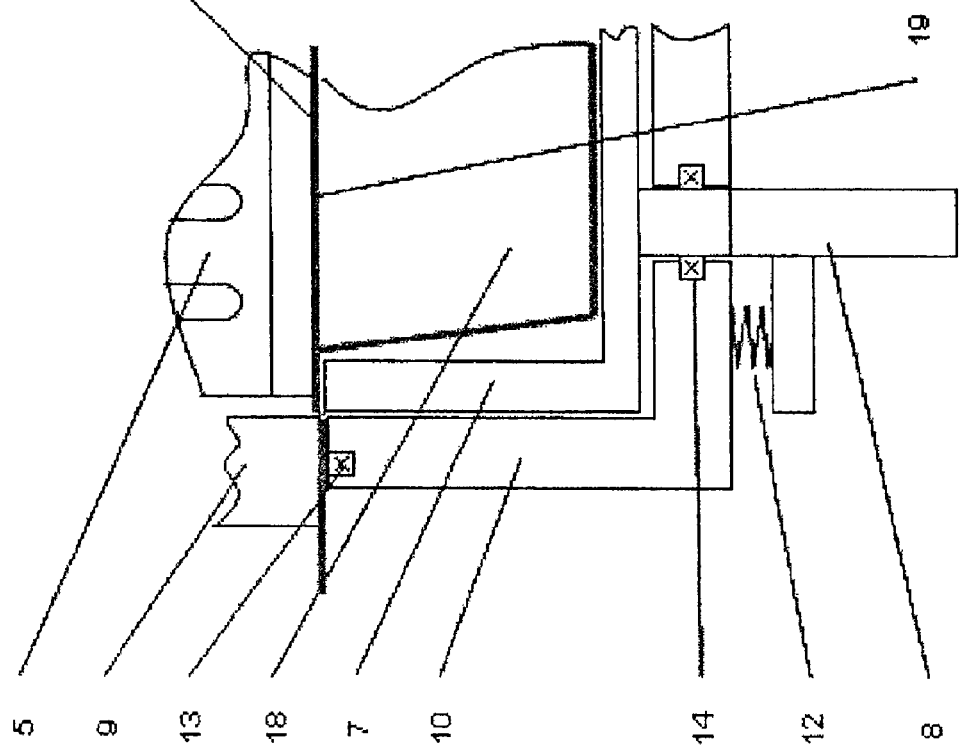

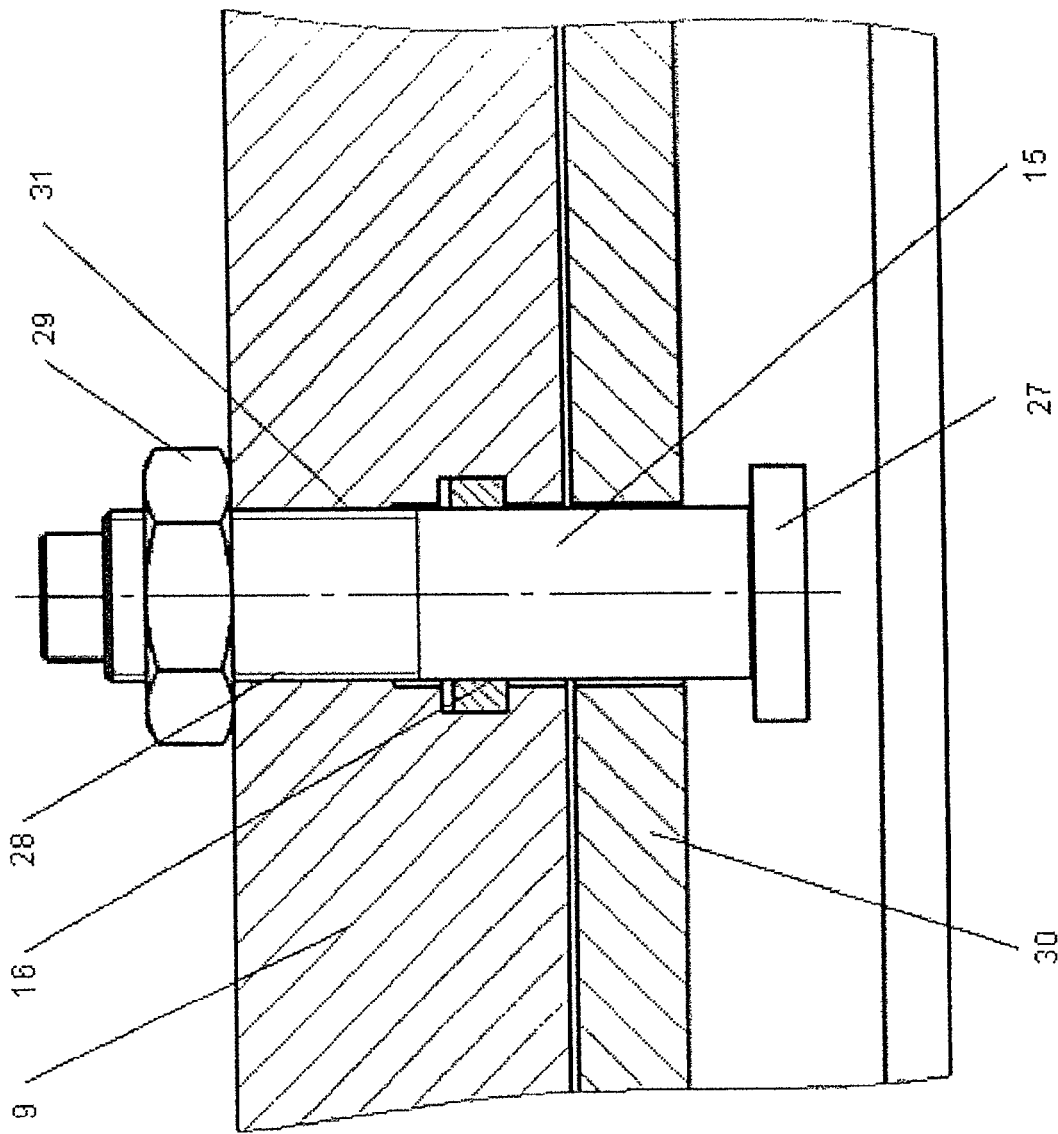

PACKAGING MACHINE HAVING AN ULTRASONIC DEVICE

CROSS-REFERENCE TO RELATED APPLICATIONS

This application claims foreign priority benefits under 35 U.S.C. § 119(a)-(d) to German patent application number DE 10 2008 035 994.7, filed Aug. 1, 2008, which is hereby incorporated by reference in its entirety.

BACKGROUND OF THE INVENTION

1. Field of the Invention

The present invention relates to a packaging machine having an ultrasonic device. The packaging machine may particularly be a deep-drawing machine.

2. Background Art

Document EP-1 110 701 B1 describes a system for welding blister packs. Said system comprises a multitude of sonotrodes and an oppositely located welding die in which recesses are defined. Several sonotrodes are assigned to each recess. The system seals the blister packs by means of ultrasonic welding.

Document EP-1 510 459 B1 describes a similar system, which additionally separates foil packagings by means of cutting.

Documents EP-1 717 150 A1, DE 10 2005 039 673 A1 and DE 10 2005 039 690 A1 each describe a deep-drawing machine which seals foil packagings by means of ultrasonic welding and separates same by means of punching.

SUMMARY

A packaging machine according to the present invention may be capable of producing particularly durable packagings with an increased cycle yield.

The sealing may be accomplished by means of ultrasound in a vacuum and/or modified atmosphere. Thus, durable packagings may be produced and the cycle yield increased.

A packaging machine may be provided in which the evacuation and/or the gas injection with a modified atmosphere, the sealing and the cutting are accomplished in one single station. Thus, the whole packaging machine may be compact in an advantageous manner.

A sonotrode may be used, which is positioned exactly by means of an adjustable stop. Thus, a protective foil on the sonotrode can advantageously be waived/omitted.

A form-variable cutting tool, such as a steel strip, may be used as a cutting device. Thus, it can be readily exchanged in an advantageous manner without requiring to exchange a complete anvil.

A first seal may be provided between a transformation intermediate piece and an upper chamber part, which is located in a vibration node of the standing wave. Thus, the tightness can be ensured in an advantageous manner.

Additional and useful features of the invention appear from the description of an embodiment by means of the accompanying drawings.

BRIEF DESCRIPTION OF THE DRAWINGS

FIG. 2 shows a schematic sectional view of an ultrasonic device for the packaging machine according to the present invention;

FIG. 3a shows a schematic detail in the sectional view of the ultrasonic device for the packaging machine according to the present invention when relatively thick foils are used;

FIG. 3b shows a schematic detail in the sectional view of the ultrasonic device for the packaging machine according to the present invention when relatively thin foils are used;

FIG. 4a shows a sectional view of a stop for a sonotrode of the ultrasonic device for the packaging machine according to the present invention, with the sonotrode being in a lifted position;

DETAILED DESCRIPTION

One embodiment of a packaging machine according to the invention shall be described by means of a deep-drawing machine, with reference to the figures.

Figure 1:
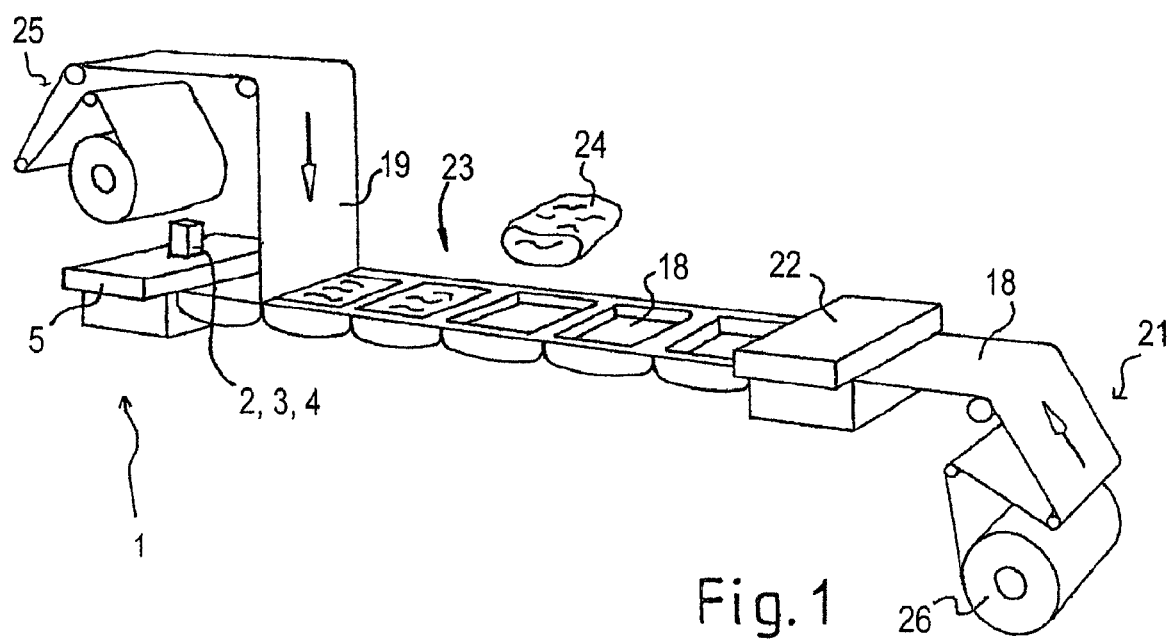
FIG. 1 shows a schematic view of essential parts of a packaging machine according to the present invention.

According to FIG. 1, the deep-drawing machine comprises a lower foil feeder 21, a molding station 22, a filling station 23, an upper foil feeder 25 and an ultrasonic device 1 having integrated evacuating, gas injection, sealing and cutting functions.

The operation of the deep-drawing machine is as follows: Initially, a lower foil 18 is withdrawn by the lower foil feeder 21 from a lower foil roll 26 and is fed to the molding station 22. In the molding station 22 the lower foil 18 is heated in a mold and deep-drawn to form packaging troughs. The packaging troughs may be provided in one track or multiple tracks of the lower foil 18. Next, the lower foil 18 is advanced into the filling station 23 in which the created packing troughs are manually or automatically filled with the material to be packed 24. In the next step, the deep-drawn and filled lower foil 18 is advanced into the ultrasonic device 1 having integrated evacuating, gas injection, sealing and cutting functions. In the ultrasonic device 1 an upper foil 19 is placed upon the lower foil 18, and the air inside an evacuation chamber (FIG. 2) and the package located therein is sucked off or evacuated and/or gas is injected, respectively. Then, the package is sealed by welding the upper foil 19 along a sealing edge of the package to the lower foil 18. The sealing is achieved with ultrasonic vibrations which are transferred under pressure to the upper foil 19, whereby a welding heat necessary for the softening is generated by means of molecular and boundary-layer friction. Owing to the local temperature the upper foil 19 and/or the lower foil 18 start(s) to get soft, and they are welded together.

The cutting is performed simultaneously with the sealing in the ultrasonic device 1.

FIG. 2 shows a schematic sectional view of an ultrasonic device 1 for the packaging machine according to the present invention. The ultrasonic device 1 comprises an ultrasonic generator 2 which generates electric vibrations, an ultrasonic converter 3 coupled thereto which converts the generated electric vibrations into mechanical vibrations of the same frequency, and a transformation intermediate piece 4 which transfers the mechanical vibrations to a sonotrode 5. The sonotrode 5 comprises a sound-radiating end surface 6 at which it reflects the mechanical vibrations, so that a standing wave to be passed onto the upper foil 19 is formed. According to the present invention the sound-radiating end surface 6 is disposed in a vacuum and/or in a modified atmosphere, which will be described in more detail below.

The ultrasonic device 1 additionally comprises an anvil 7 which is disposed opposite the sound-radiating end surface 6 of the sonotrode 5. A sealing plane of a package to be sealed is defined between the anvil 7 and the sound-radiating end surface 6 of the sonotrode 5. In the sealing plane the lower foil 18 and the upper foil 19 are welded together and cut by means of ultrasound.

The sonotrode 5 is lifted and lowered by a non-illustrated driving device so as to move towards and away from the anvil 7.

FIGS. 3a and 3b each show a schematic detail in the sectional view of the ultrasonic device 1 for the packaging machine according to the present invention. The sealing plane of the package to be sealed is discernable between the anvil 7 and the sound-radiating end surface 6 of the sonotrode 5. In the sealing plane the lower foil 18 and the upper foil 19 are welded together by means of ultrasound.

The anvil 7 can be moved by a lifting device 8 towards the sonotrode 5 and away from the sonotrode 5. The anvil is rigidly connected to the lifting device 8.

As is shown in FIGS. 2, 3a and 3b, the ultrasonic device 1 further comprises the evacuation chamber formed by an upper chamber part 9 and a mobile lower chamber part 10. The sonotrode 5 and the anvil 7 are disposed in the evacuation chamber, and the transformation intermediate piece 4 penetrates the upper chamber part 9. Between the transformation intermediate piece 4 and the upper chamber part 9 a first seal 11 is provided, which is located in a vibration node K of the standing wave. This advantageously improves the tightness of the first seal 11 because no or only a small relative movement takes place at the first seal 11.

The mobile lower chamber part 10 can be moved by the lifting device 8 towards the upper chamber part 9 and away from same, with a resilient member 12 being provided between the lifting device 8 and the lower chamber part 10 which resiliently presses the mobile lower chamber part 10 against the upper chamber part 9. The lower foil 18 and the upper foil 19 are clamped between the upper chamber part 9 and the mobile lower chamber part 10 when the lower chamber part 10 is moved to the upper chamber part. The resilient member 12 allows to compensate variations in the foil thicknesses, whereby relatively thick foils 18, 19 can be used, which is shown in FIG. 3a, and relatively thin foils 18, 19 can be used, which is shown in FIG. 3b. The resilient member 12 may be a rubber pad which is supported, for example, on a plate on the lifting device 8.

A second seal 13 is disposed between the upper chamber part 9 and the lower chamber part 10. Alternatively, the second seal 13 can assume the function of the resilient member 12, for example, if the second seal 13 is formed as an annular silicone seal. In this case, the resilient member 12 as a separate component may be waived.

The lifting device 8 penetrates the lower chamber part 10, and a third seal 14 is disposed between the lifting device 8 and the lower chamber part 10.

Figure 4B:
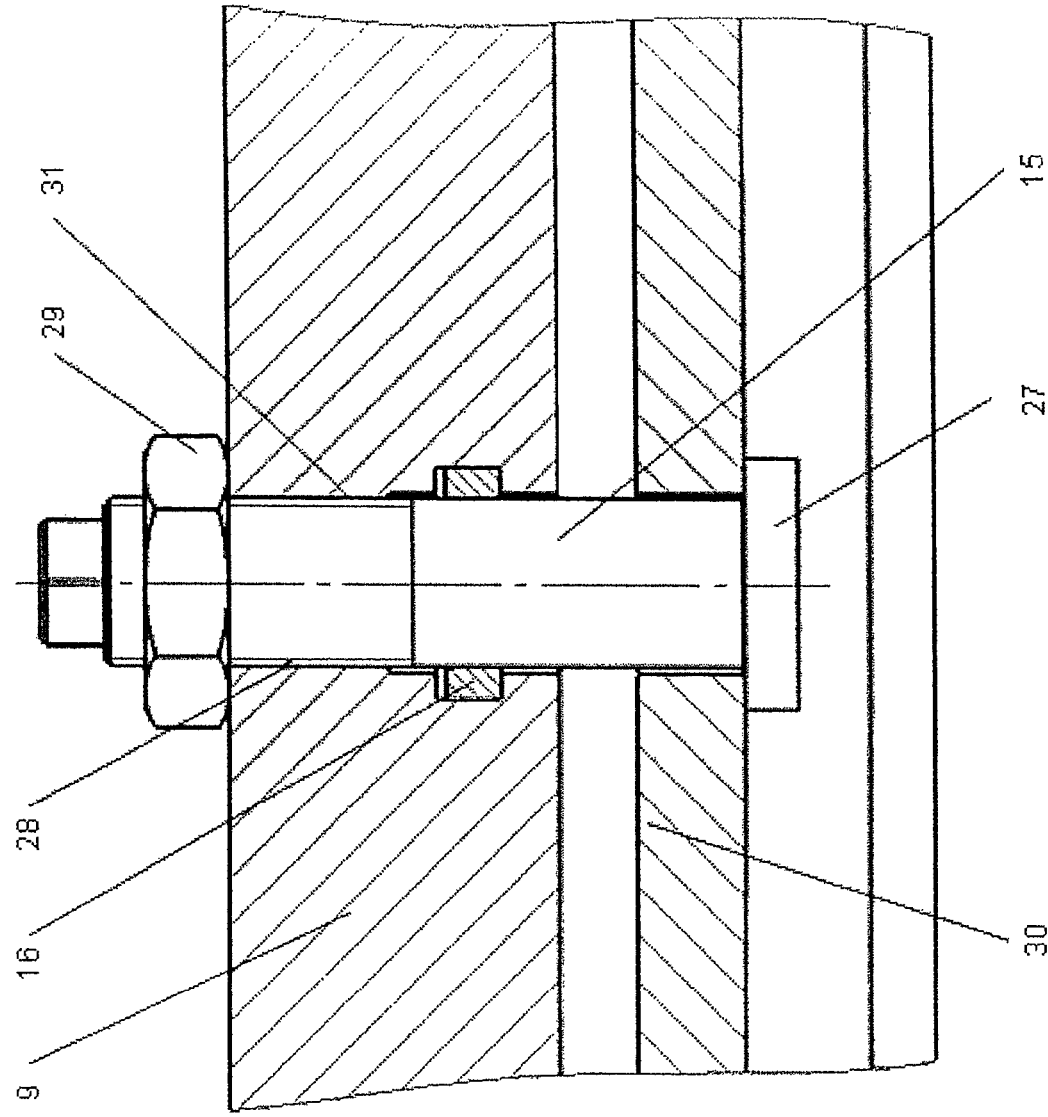
FIG. 4b shows a sectional view of the stop for the sonotrode, with the sonotrode being in a lowered position.

FIG. 4a shows a sectional view of an adjustable stop 15 for the sonotrode 5 of the ultrasonic device 1 according to FIG. 2, with the sonotrode 5 having been lifted into its lifted position by means of the non-illustrated driving device. FIG. 4b shows a sectional view of the adjustable stop 15 for the sonotrode 5 of the ultrasonic device 1 according to FIG. 2, with the sonotrode 5 being in the lowered position in which it rests on the stop 15. Reference number 30 in FIG. 4a and 4b designates a sonotrode holder to which the sonotrode 5 is fixed and which moves integrally with the sonotrode 5. By means of the adjustable stop 15 the position of the sonotrode 5 is variably adjustable relative to the upper chamber part 9 and, therefore, also relative to the anvil 7. The adjustable stop 15 can be fixed variably to the upper chamber part 9. In the embodiment according to FIGS. 4a and 4b, the stop 15 is formed by a bolt 15 having an external thread 28. The bolt 15 is screwed into a corresponding internal thread 31 of an upper wall of the upper chamber part 9. On one end of the bolt 15 a bolt head 27 is located. The other end of the bolt projects from an upper surface of the upper chamber part 9. A lock nut 29 is screwed onto the external thread 28 of the bolt 15 and retains the same at the upper chamber part 9. By rotating the lock nut 29 the stop 15, i.e. the bolt may be fixed into position. The sonotrode 5 rests by means of the sonotrode holder 30 on a stop surface of the bolt 15, which is defined by the bolt head 27. Accordingly, when adjusting the bolt 15 the sonotrode holder 30 and the sonotrode 5 are displaced in the same manner.

A fourth seal 16 is disposed between the stop 15, i.e. the bolt 15 and the upper chamber part 9.

The number of the stops 15 may be one or more. If three or four stops 15 are provided the sonotrode 5 can be oriented three-dimensionally.

Figure 5A:
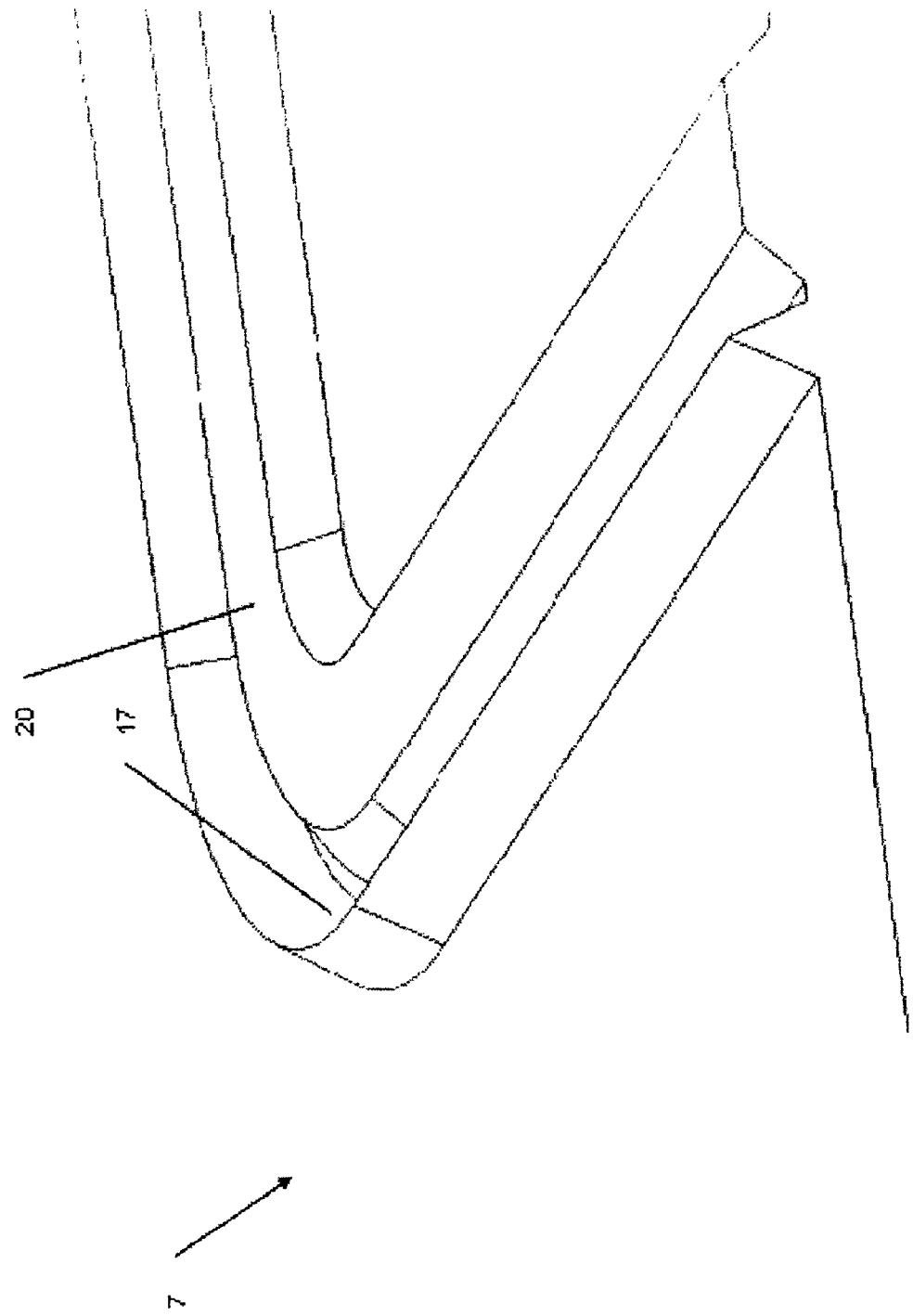
FIG. 5a shows a section-like perspective view of an anvil of the ultrasonic device for the packaging machine according to the present invention.

FIG. 5a shows a perspective view of an anvil 7. The anvil 7 comprises a cutting device 17 which interacts with the sonotrode 5 so as to cut the lower foil 18 and the upper foil 19 by means of ultrasound. The shape of the cutting device 17 is adapted to the outer shape of the individual packages.

Figure 5B:
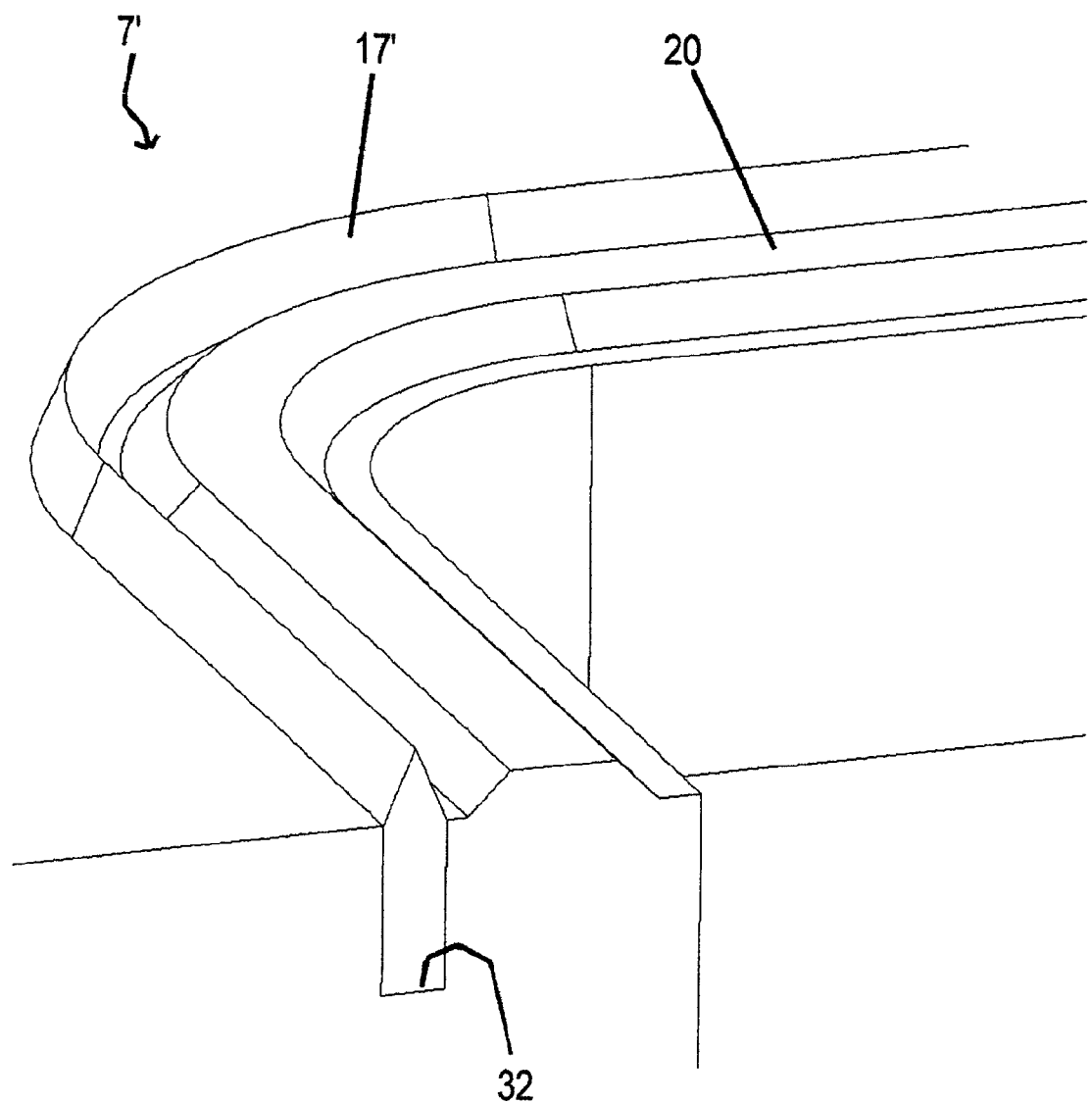
FIG. 5b shows a section-like perspective view of the anvil according to a modified embodiment.

FIG. 5b shows a section-like perspective view of an anvil 7' according to a modified embodiment. The cutting device 17' is here form-variable like, for example, a steel strip, which is fitted into a corresponding groove 32 in the anvil 7'. The steel strip is easily exchangeable, if required, whereby the exchange of the complete anvil 7' is not necessary.

The anvil 7, 7' moreover has a raised portion 20 which defines in cooperation with the sound-radiating end surface 6 a sealing contour within the sealing plane. The raised portion 20 is adapted to the desired sealing seam of the packages. In the embodiment shown, the raised portion 20 is substantially continuous.

Before the ultrasonic device 1 according to FIG. 2 is put into operation, the position of the sonotrode 5 relative to the anvil 7 has to be adjusted. To this end, the anvil 7 is moved upwardly into its permanently preset operating position in which the ultrasonic welding and the cutting are performed and in which the anvil 7 is fixed into position. Now, the sonotrode 5 is lowered by its non-illustrated driving device so as to adopt its lowered position according to FIG. 4b. The sonotrode holder 30 rests on the head 27 of bolt 15. Subsequently, the bolt 15 is manually rotated into or out of the upper chamber part 9 until the sound-radiating end surface 6 of the sonotrode 5 is just about out of touch with the cutting device 17. Preferably, the ultrasonic generator 2 is activated during this procedure, so that the amplitude of the sound-radiating end surface 6 can be taken into account in the adjustment. Now, the lock nut 29 is tightened so as to fix the stop 15 or bolt 15, respectively, to the upper chamber part 9.

If several bolts 15 are provided, the procedure is repeated correspondingly.

Notwithstanding this adjustment the first seal 11 substantially remains in the vibration node K of the standing wave as the wavelength of the standing wave is sufficiently great as compared to the adjustment range of the bolt 15. If necessary, the operating position of the anvil 7 can be varied by the control system of the lifting device 8, so that the first seal 11 is located in the vibration node K of the standing wave and the cutting device 17 is just about out of touch with the sound-radiating end surface 6.

Typically, sonotrodes have a protective foil on the sound-radiating end surface 6. The protective foil prevents wear and tear on the sound-radiating end surface 6 and on the cutting device 17 as a result of the ultrasonic welding. The present invention has the advantage that such a protective foil may be waived because the cutting device 17 does not touch the sound-radiating end surface 6. This advantage is realized with the adjustable stop 15 which variably adjusts the position of the sonotrode 5 relative to the upper chamber part 9, which, again, is exactly adapted to the permanently preset operating position of the anvil 7. Due to this adjusting possibility a simplified and inexpensive sonotrode 5 can be provided.

After the presetting of the sonotrode 5 was performed, the actual operation of the packaging machine can be started. The operation of the ultrasonic device 1 according to FIG. 2 is as follows:

When the sealing process is performed, first, the anvil 7 is lifted by the lifting device 8 to its permanently preset operating position. At the same time, the lower chamber part 10 is moved towards to the upper chamber part 9 so that the lower chamber part 10 is resiliently adjacent to the upper chamber part 9. In FIGS. 3a and 3b it is illustrated how at least the upper foil 19 is then clamped and sealed between the lower chamber part 10 and the upper chamber part 9. Owing to the elasticity of the resilient member 12 it is irrelevant whether thick or thin foils 18, 19 are used. Moreover, the evacuation chamber is sealed by the second seal 13 on the parting plane of the upper chamber part 9 and the lower chamber part 10.

In the next step the evacuation of the evacuation chamber takes place by sucking off the air out of the evacuation chamber. If desired, the evacuation chamber can then be filled with an inert atmosphere.

Next, the sonotrode 5 is lowered by the non-illustrated driving device from the lifted position according to FIG. 4a into the lowered position according to FIG. 4b so that the sonotrode holder 30 rests on the head 27 of the bolt 15. This lowered position according to FIG. 4b defines the sealing position in which the sealing is to be performed. The travel effected by the non-illustrated driving device is clearly smaller than the wavelength of the standing wave, so that the seal 11 remains substantially within the vibration node of the standing wave.

In the next step the sealing and the cutting are performed. The anvil 7 was already moved by the lifting device 8 into its operating position towards the sonotrode 5 (in which the cutting device 17 is just about out of touch with the sound-radiating end surface 6). The ultrasonic generator 2 is switched on. This results in the ultrasonic welding of the upper foil 19 to the lower foil 18, and the individual packages are separated by the cutting device 17 at the same time.

Then, the evacuation chamber is aerated, and the anvil 7 and the lower chamber part 10 are moved downwardly by the lifting device 8. The sonotrode 5 is lifted into its lifted position according to FIG. 4a. The upper foil 19 and the lower foil 18 are released and pushed forward out of the ultrasonic device 1. The remainder of the upper foil is removed by a non-illustrated foil remainder roll-up means. The packages are then withdrawn by a non-illustrated device or manually.

The packaging machine operates in cycles. At the end of each cycle the lower foil 18 is advanced by one withdrawal length. The above-described operation is repeated intermittently per cycle.

In the embodiment shown, several seals are used which are adjacent to mobile parts. Preferably, lip seals are therefore used.

Preferably, the width of the first seals 11 is adapted to overlap with the vibration node of the standing wave by taking into account the displacement of the sonotrode 5.

The present invention is not limited to the illustrated embodiment, but a number of modifications are possible.

In a modification of the illustrated embodiment the respective seal may also be provided on the corresponding counterpart, that is, the first seal 11 can be provided on the transformation intermediate piece 4, the second seal 13 can be provided on the upper chamber part 9, the third seal 14 can be provided on the lifting device 8, and the fourth seal 16 can be provided on the adjustable stop 15.

Although not shown in FIG. 5, the anvil 7 preferably comprises nozzles arranged around the cutting device 17, which pierce the lower foil 18 or are in alignment with holes already incorporated in the lower foil 18 as the anvil 7 is in its operating position. The nozzles communicate with a non-illustrated evacuation and/or gas injection device and permit the evacuation of and/or gas injection into the package interior with the modified atmosphere such as, for example, inert gas.

Preferably, the second seal 13 may assume the function of the resilient member 12, e.g. if the second seal 13 is formed as an annular silicone seal. In this case the resilient member 12 as a separate component may be waived.

In the embodiment the anvil 7 is rigidly connected to the lifting device 8, and the lower chamber part 10 is connected to the lifting device 8 by the resilient member 12. Alternatively, the anvil 7 may be permanently connected to the lower chamber part 10 and the lifting device 8. In this case the resilient member 12 and moreover the third seal 14 are not necessary.

At the same time, the second seal 13 provides for the compensation of the different foil thicknesses by being elastically deformed when the lower chamber part 10 was moved to the upper chamber part 9. With thick foils the second seal 13 is compressed more intensively than with thin foils.

The scope of protection is not limited to the illustrated embodiment, but it comprises further alterations and modifications, provided that these are within the scope defined by the accompanying claims.

What is claimed is:

1. A packaging machine having an ultrasonic device, the ultrasonic device comprising:
   an ultrasonic generator which generates electric vibrations;
   an ultrasonic converter which converts the generated electric vibrations into mechanical vibrations of the same frequency;
   a sonotrode having a sound-radiating end surface;
   a transformation intermediate piece which transfers the mechanical vibrations to the sonotrode;
   an anvil disposed opposite the sound-radiating end surface of the sonotrode, wherein a sealing plane of a package to be sealed is definable between the anvil and the sound-radiating end surface;
   an evacuation chamber formed by an upper chamber part and a mobile lower chamber part; and
   a first seal;
   wherein the sound-radiating end surface of the sonotrode is for reflecting the mechanical vibrations to form a standing wave to be passed into a packaging foil, the sound-radiating end surface and the anvil are disposable in the evacuation chamber such that the sound-radiating end surface is disposable in a vacuum and/or in a modified atmosphere, the transformation intermediate piece penetrates the upper chamber part, the first seal is provided between the transformation intermediate piece and the upper chamber part, and the first seal is located in a vibration node of the standing wave when the standing wave is formed by the sonotrode.

2. The packaging machine according to claim 1, wherein the anvil can be moved by a lifting device towards the sound-radiating end surface of the sonotrode and away from the same.

3. The packaging machine according to claim 1, wherein the ultrasonic device further comprises a lifting device for moving the anvil towards and away from the sound-radiating end surface of the sonotrode, and an elastic second seal disposed between the upper chamber part and the lower chamber part, and wherein the lower chamber part can be moved towards and away from the upper chamber part, and the anvil is permanently connected to the lower chamber part and the lifting device.

4. The packaging machine according to claim 3, wherein a position of the sonotrode is variably adjustable relative to the upper chamber part by an adjustable stop.

5. The packaging machine according to claim 1, wherein the mobile lower chamber part can be moved towards and away from the upper chamber part, a resilient member is provided, which resiliently presses the mobile lower chamber part against the upper chamber part, and a second seal is disposed between the upper chamber part and the lower chamber part.

6. The packaging machine according to claim 5 wherein the ultrasonic device further comprises a lifting device for moving the anvil towards and away from the sound-radiating end surface of the sonotrode, and wherein the anvil is rigidly connected to the lifting device, and the lower chamber part is connected to the lifting device by the resilient member.

7. The packaging machine according to claim 1 wherein the ultrasonic device further comprises a lifting device for moving the anvil towards and away from the sound-radiating end surface of the sonotrode, and a second seal disposed between the lifting device and the lower chamber part, and wherein the lifting device penetrates the lower chamber part.

8. The packaging machine according to claim 1, wherein a position of the sonotrode is variably adjustable relative to the upper chamber part by an adjustable stop.

9. The packaging machine according to claim 8, wherein the adjustable stop comprises a bolt which can be variably fixed to the upper chamber part, and a second seal is disposed between the bolt and the upper chamber part.

10. The packaging machine according to claim 1, wherein the anvil comprises a raised cutting device that is cooperable with the sound-radiating end surface of the sonotrode to cut the packaging foil by means of ultrasound.

11. The packaging machine according to claim 1, wherein the anvil has a raised portion which defines a sealing contour within the sealing plane.

12. The packaging machine according to claim 11, wherein the raised portion is substantially continuous.

13. The packaging machine according to claim 1, further comprising:
 a gas injection device that is configured to inject gas with the modified atmosphere into an interior of the packaging foils.

14. The packaging machine according to claim 1, wherein the ultrasonic device further comprises a lifting device for moving the anvil towards and away from the sound-radiating end surface of the sonotrode, and a resilient member that is configured to resiliently press the mobile lower chamber part against the upper chamber part, and wherein the anvil is rigidly connected to the lifting device, and the lower chamber part is connected to the lifting device by the resilient member.

15. The packaging machine according to claim 1, wherein the ultrasonic device further comprises a lifting device for moving the anvil towards and away from the sound-radiating end surface of the sonotrode, and wherein the lifting device penetrates the lower chamber part.

16. A packaging machine having an ultrasonic device for sealing a package, the ultrasonic device comprising:
 an upper chamber part and a lower chamber part that are cooperable to form an evacuation chamber;
 a sonotrode having a sound radiating end surface disposed between the chamber parts;
 an anvil disposed between the chamber parts opposite the sound-radiating end surface of the sonotrode;
 a transformation piece that penetrates the upper chamber part for transferring mechanical vibrations to the sonotrode; and
 a first seal provided between the transformation piece and the upper chamber part;
 wherein the sonotrode is configured to form a standing wave to be passed into a packaging foil that is received between the end surface and the anvil, and wherein the first seal is located in a vibration node of the standing wave when the standing wave is formed by the sonotrode.

17. The packaging machine of claim 16 wherein the ultrasonic device further includes an adjustable stop for variably adjusting position of the sonotrode with respect to the upper chamber part.

* * * * *